May 12, 1953  D. J. MUNSON  2,638,016
ACCELERATOR HOLDING MEANS
Filed Feb. 29, 1952
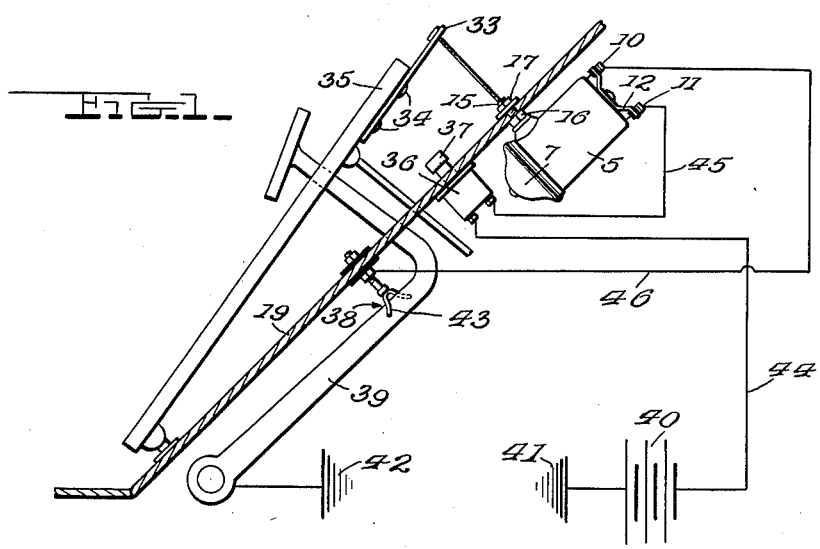
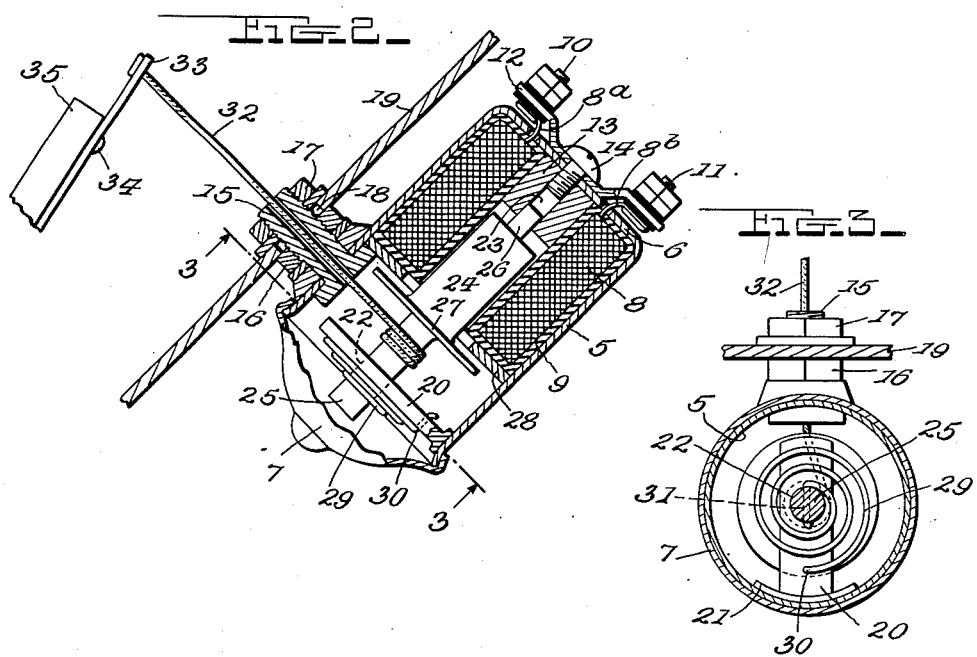
INVENTOR.
Donald J. Munson
BY
atty.

Patented May 12, 1953

2,638,016

UNITED STATES PATENT OFFICE 2,638,016

ACCELERATOR HOLDING MEANS

Donald J. Munson, Anderson, Ind.

Application February 29, 1952, Serial No. 274,093

5 Claims. (Cl. 74—513)

This invention relates to a novel device for holding the accelerator pedal of an automobile or other motor vehicle in any selected depressed position when a desired speed has been attained, thereby relieving the driver of the tiresome necessity of holding the accelerator down.

A spring-rotated solenoid core is connected by a cable or the like with the accelerator pedal or with an element of the carburetor linkage and serves as a reel upon which said cable is wound as the pedal is depressed; a driver-actuated switch is provided for energizing the solenoid coil when it is desired to hold the accelerator against return; the coil serves to axially shift said core to apply a brake means and a core-carried brake member is held tightly against a fixed brake member as long as said core is held in its shifted position by said coil, thereby holding the core against retrograde turning until the solenoid circuit is broken, and thus permitting the driver to remove his foot from the accelerator without allowing the pedal to return under the influence of the usual accelerator spring.

One object of the invention is to provide an exceptionally simple, compact and inexpensive solenoid-brake-and-cable assembly which may be quickly and easily installed and will effectively perform the desired function.

Another object of the invention is to provide the casing of the device with a projecting tubular stud which not only acts as an attaching stud but guides the cable to the reel.

A further object of the invention is to provide a simple spring which is tensioned in one direction to exert a turning force on the reel and is tensioned in another direction to yieldably hold said reel in brake-released position.

With the above and other objects in view that will become apparent as the nature of the invention is better understood, the same consists in the novel form, combination and arrangement of parts hereinafter more fully described, shown in the accompanying drawing, and claimed.

In the drawing:

Fig. 1 is a side elevation partly in section, showing the invention operatively associated with the accelerator pedal and brake pedal of an automobile, Fig. 2 is an enlarged vertical sectional view of the solenoid-brake-and-cable assembly attached to the floor board of the car, and Fig. 3 is a transverse sectional view on line 3—3 of Fig. 2.

A cylindrical casing is shown at 5, said casing being closed at one end by an integral end wall 6 and being closed at its other end by a cap 7. The casing and cap are formed from pressed metal and the cap is preferably so secured that it cannot be easily removed, preventing unskilled workmen from tampering with the parts housed within the casing.

Within the casing 5, a solenoid coil 8 is fixedly mounted, said coil abutting the end wall 6 and having suitable insulation 9. The terminals 8ª and 8ᵇ of this coil are directly connected with binding posts 10 and 11, respectively, on a bracket 12 at the outer side of the end wall 6. For a purpose to appear, a bearing 13 is provided at the inner side of this endwall within the confines of the coil 8, and a single screw 14 is shown for securing both this bearing and the bracket 12 in place.

Between the coil 8 and the cap 7 the casing is provided with a radially projecting, rigidly secured, attaching stud 15 of tubular form. This stud carries inner and outer nuts 16 and 17, whereby said stud may be passed through an opening 18 in a floor board 19 and said nuts used to clamp it tightly in place, thereby rigidly mounting the casing 5 in an extremely simple manner.

A bearing post 20 is rigidly mounted at 21 in the casing 5, near the cap 7 and in spaced relation with the inner end of the coil 8. This post is formed with a bearing opening 22 alined with the bearing opening 23 of the bearing 13, and these two openings serve to rotatably and slidably mount a solenoid core 24. This core is provided with an end extension 25 extending through the bearing opening 22 and with a bearing stud 26 received in the opening 23. At the juncture of the extension 25 with the core body, the core is provided with an integral brake disk 27 for cooperation with a fixed brake disk 28, the latter being non-rotatably held in the casing 5 and preferably abutting the adjacent end of the coil 8. The disk 27 is normally spaced slightly from the fixed disk 28 but is drawn into contact with said disk 28 and non-rotatably held when the solenoid core 24 is drawn inwardly upon energizing of the coil 8. The fixed disk 28 is preferably formed of compressed fibre such as that commonly used for insulating purposes.

A spiral spring 29 is anchored at its outer end to the post 20 as seen at 30, and is connected at its inner end to the core extension 25 as seen at 31. This spring 29 is tensioned circumferentially to exert a turning force on the core 24, and is tensioned axially to normally shift said core outwardly and hold the brake disk 27 out of contact with the fixed brake disk 28.

A small cable 32 extends through the tubular attaching stud 15 and is secured at its inner end to the core extension 25. A simple attaching plate 33 is provided for the outer end of the cable 32 to be secured by fasteners 34 to the accelerator pedal 35. When the pedal 35 occupies its idling position, the spring 29 is fully tensioned, with the result that depression of said pedal 35 to any position will cause said spring to rotate the solenoid core 8, thereby winding the cable 32 on the extension 25 which then constitutes a reel. As the accelerator pedal is returned toward idling position by the usual accelerator spring, the cable unwinds from the reel and the tension of the spring 29 increases. It will thus be seen that the invention will not interfere with normal accelerator operation in heavy traffic, for instance. On the open road, however, the driver may bring the device into play to hold the accelerator depressed for any selected speed, allowing him to remove his foot from the pedal. This holding operation is accomplished by simply completing a circuit for the solenoid coil 8 and maintaining said circuit as long as desired.

A toe switch 36 is shown secured to the floor board 19 for completing and breaking the solenoid circuit. This switch is provided with an operating button 37, successive depressions of which will alternately complete and break the circuit, thus allowing full manual control of the accelerator holding means. However, as conditions will arise in which the driver will not have time to manually open the switch 36 to allow return of the accelerator pedal to idling position, there is provided a second and normally closed switch 38, said switch 38 being in series with said switch 36 and the coil 8 and being automatically opened by depression of the brake pedal 39.

Electrical wiring is shown of the type in which return flow to the battery 40 occurs through metallic parts of the car. One terminal of the battery 40 is grounded as diagrammatically indicated at 41, and the brake pedal 39 has ground connection as similarly indicated at 42. This brake pedal is utilized as the movable contact of the switch 38, said pedal normally engaging a fixed contact 43 mounted on and insulated from the floor board 19. A conductor 44 is shown leading from the battery 40 to one terminal of the toe switch 36. Leading from the other terminal of this switch 36 to the terminal 11 of the coil 8, another conductor 45 is shown, and a third conductor 46 has been shown from the terminal 10 to the contact 43 of the switch 38. All of this is simply illustrative of one circuit which may be effectively employed.

Normally, the switch 38 is closed and switch 36 is open. Thus, if the driver wishes to hold the accelerator pedal down in position for any selected speed, he will simply depress the toe button 37. This completes the solenoid circuit and the core 24 is drawn inwardly, placing the brake disk 27 against the fixed brake disk 28 and holding the two in contact until the circuit is again opened. As long as the two brake disks are held together, the pull of the usual accelerator spring cannot raise the accelerator pedal 35, as the core 24 cannot rotate and pay out the cable 32. Consequently the accelerator will be held down for the selected speed and the driver may remove his foot from the pedal. Release of the accelerator for conventional foot control may be effected by again depressing the button 37, but in emergencies, when no time exists for this manual operation, the mere depression of the brake pedal 39 will open the switch 38, thereby breaking the solenoid circuit and allowing the accelerator to return to idling position.

From the foregoing, it will be seen that novel and advantageous provision has been made for attaining the desired ends, and while there is herein shown and described the preferred embodiment of the invention, it is nevertheless to be understood that minor changes may be made therein without departing from the spirit and scope of the invention as claimed.

No claim is herein made to the combination of electromagnetic cable holding means, manually-operated switch, and brake-pedal-operated switch, in view of my prior U. S. application, Serial No. 203,115, filed December 28, 1950.

I claim:

1. Engine accelerator holding means comprising a flexible element for connection with the accelerator, a reel to which said flexible element is anchored, means mounting said reel for rotating and for axial sliding, a relatively fixed and a relatively movable brake member for holding said reel against turning when engaged with each other, said movable brake member being unitarily connected with said reel for engagement with said fixed brake member when said reel is axially shifted in one direction, a single spring connected with said reel, said spring being tensioned in one direction to normally shift said reel in brake-releasing direction and being tensioned in another direction to exert a turning force on said reel, and means whereby said reel may be shifted in brake-applying direction.

2. A structure as specified in claim 1; said spring being a spiral spring tensioned both circumferentially and axially with one end of the spring anchored to the reel and the other end thereof immovably mounted with respect to the reel.

3. Engine accelerator holding means comprising a casing having closed ends, a solenoid coil mounted in one end portion of said casing, one bearing member mounted in this end portion of said casing within the confines of said coil, a second bearing member mounted in the other end portion of said casing, a solenoid core extending into said coil, one end of said core having a bearing portion rotatably and slidably engaged with said one bearing member, the other end of said core having a reel-forming portion rotatably and slidably engaged with said second bearing member, a brake disk unitarily connected with said core for sliding and rotation therewith, a fixed brake member in said casing for cooperation with said brake disk when said core is shifted in one direction by engaging said coil, a single spiral spring connected at its outer end to said second bearing member and connected at its inner end to said reel-forming portion of said core, said spring being tensioned axially to normally shift said core in one direction and hold said brake disk free of said fixed brake member, said spring being also tensioned circumferentially to exert a turning force on said core and a flexible element connected with said reel-forming portion of said core, said flexible element extending to the exterior of said casing for connection with an accelerator.

4. A structure as specified in claim 3; together with a tubular attaching stud for said casing, said stud projecting from said casing for passage through an opening in a support, and clamping means threaded on said stud for securing it to the support, said flexible element extending through said stud.

5. A structure as specified in claim 3; said one bearing member being in contact with the inner side of one end of said casing, a bracket having binding posts for said coil, said bracket being in contact with the outer side of said one end of said casing, and a screw clamping said one bearing member and said bracket against said casing end.

DONALD J. MUNSON.

References Cited in the file of this patent

UNITED STATES PATENTS

| Number | Name | Date |
|---|---|---|
| 1,530,894 | Hayes | Mar. 24, 1925 |
| 2,270,002 | Glick | Jan. 13, 1942 |
| 2,528,745 | Fisher | Nov. 7, 1950 |
| 2,554,619 | Goik | May 29, 1951 |